United States Patent [19]

Soulsby et al.

[11] 4,064,903

[45] Dec. 27, 1977

[54] NOISE ENCLOSURE FOR HYDRAULIC VALVE

[75] Inventors: John E. Soulsby, Mentor; Richard J. Malecha, Cleveland, both of Ohio

[73] Assignee: Towmotor Corporation, Mentor, Ohio

[21] Appl. No.: 702,546

[22] Filed: July 6, 1976

[51] Int. Cl.$^2$ .............................................. F16K 51/00

[52] U.S. Cl. ..................................... 137/375; 181/200

[58] Field of Search ...................... 137/375; 181/33 K

[56] References Cited

U.S. PATENT DOCUMENTS

| | | | |
|---|---|---|---|
| 3,139,106 | 6/1964 | Wallin | 137/375 |
| 3,723,027 | 3/1973 | Montelius | 181/33 K X |

*Primary Examiner*—Robert G. Nilson

*Attorney, Agent, or Firm*—Phillips, Moore, Weissenberger, Lempio & Majestic

[57] ABSTRACT

A noise attenuating enclosure for a hydraulic valve is provided. The enclosure has separate top, bottom, side and cover members fabricated from sheet metal material and lined with relatively thick sound energy barrier material such as a foam rubber or polyurethane foam. The cover member has opposed open side portions for receiving hydraulic lines for the valve. Such open sides are filled during valve operation by means of fitted rubber plug members having closely fitting apertures for sealingly accepting the hydraulic lines. All fastening and access points and all locations where metal to metal contact would normally be necessary are provided with noise suppression material.

4 Claims, 5 Drawing Figures

Fig. 3
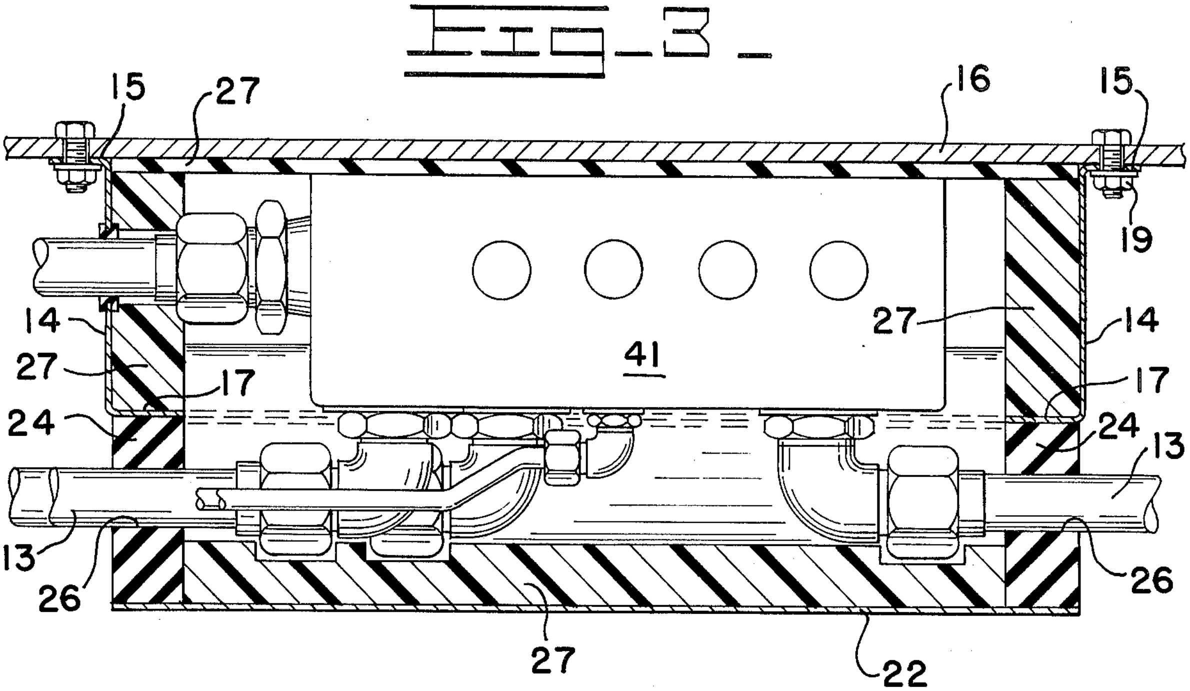
Fig. 4
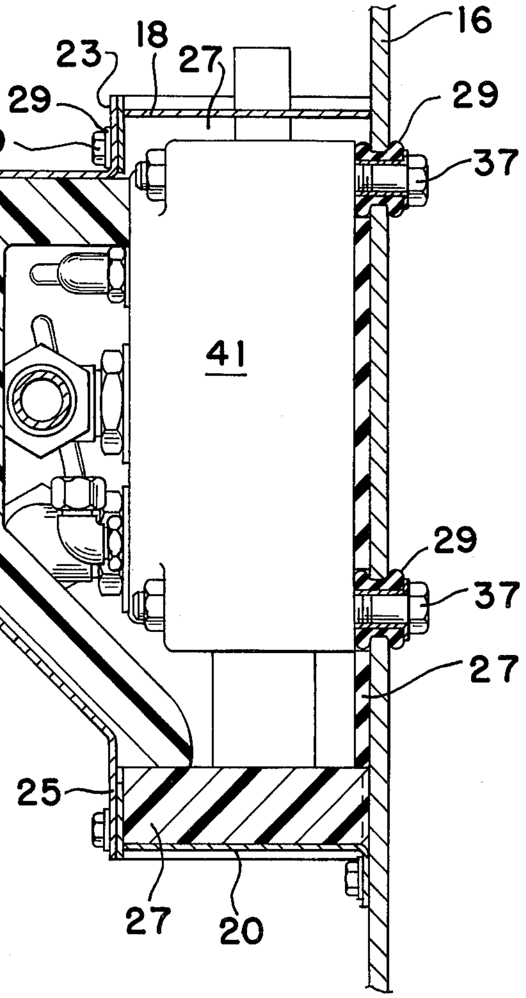
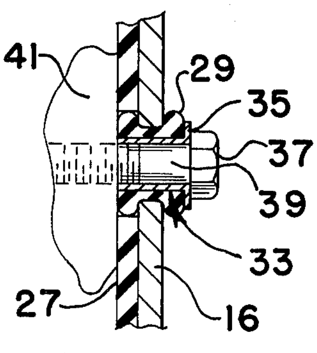
Fig. 5

NOISE ENCLOSURE FOR HYDRAULIC VALVE

BACKGROUND OF THE INVENTION

The present invention relates to a housing or enclosure structure for a noise producing hydraulic valve in a lift truck or other commercial vehicle. More particularly, the invention relates to a fitted metal valve enclosure which provides easy access to valve components while substantially curtailing the transmission of noise produced by the valve.

Many hydraulic valve systems, such as the system for tilting the mast structure in a lift truck, often produce rather objectionable levels of noise. Governmental standards now require the attenuation of such noise levels for improved environmental quality. In response to such standards, new valve systems are being devised with greatly improved sound characteristics. However, immediate treatment is needed for existing valve systems which cannot be readily replaced or redesigned. This is the problem to which the present invention is addressed.

SUMMARY AND OBJECTS OF THE INVENTION

The instant invention comprises an enclosure for a hydraulic valve having separate top, bottom, side and cover members. Said members are provided with apertures for receiving valve fittings and fluid transmission means, the apertures being treated with sound attenuating material. Substantially the entire interior area of said enclosure is lined with sound attenuating material.

The primary object of the present invention is to provide an enclosure structure for a noise producing hydraulic valve which substantially completely seals and isolates the valve from the environment.

Another object of the present invention is to provide such an enclosure having major components fabricated from sheet metal lined with sound suppressing material.

A still further object of the present invention is to provide such an enclosure having a readily removable cover plate member with open side portions wherein each side portion is filled during valve operation by means of a fitted rubber plug.

Further and other objects and advantages of this invention will be more readily apparent from a review of the following description and accompanying drawings.

BRIEF DESCRIPTION OF THE DRAWINGS

FIG. 3 is a sectional view of the invention taken along the lines III—III in FIG. 2;

FIG. 4 is a sectional view of the invention taken along lines IV—IV in FIG. 2; and, FIG. 5 is an enlarged view of a portion of the structure shown in FIG. 4 illustrating details thereof.

DETAILED DESCRIPTION

Figure 1:
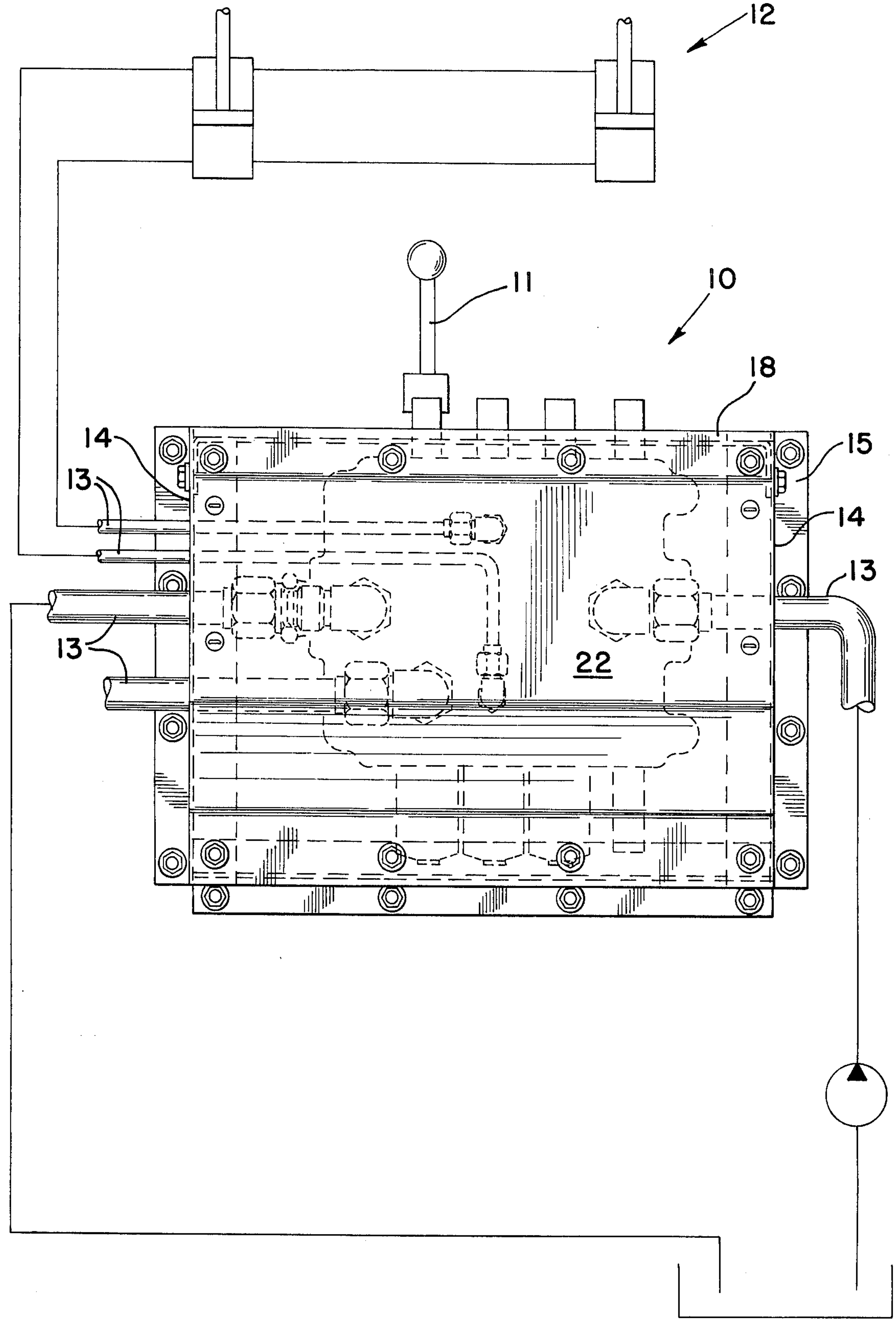
FIG. 1 is a front elevation view of the present valve enclosure, including a schematic showing of a typical utilization for the valve enclosed.

Referring to FIG. 1, the valve enclosure of the present invention is shown generally at 10 in association with the hydraulic mast tilting system of a lift truck, shown generally at 12. The mast tilting system, the details of which are not a part of this invention, includes a source of hydraulic fluid under pressure and a pair of hydraulic jacks actuated by such fluid in accordance with the positioning of the valve (shown in phantom) enclosed by the housing structure 10. It may be noted that a valve actuation level 11 and hydraulic flow lines or conduits 13 for the transmission of fluid to and from the valve protrude from the valve and must be accessible from the exterior of the enclosure 10. A portion of the lift truck, or similar vehicle with which the present invention is associated, is shown at 16 in FIG. 2.

The valve enclosure consists essentially of five major components fabricated from sheet steel or other relatively durable and rigid material. The enclosure includes a pair of opposed side members 14 having oppositely facing parallel flanges 15, 17. The respective flanges 15 receive a plurality of fasteners such as bolts and nuts 19 for firmly attaching the side members to the vehicle portion 16. A top or cap member 18, provided with downwardly extending side flanges, is bolted or otherwise attached between the side members 14, as shown best in FIGS. 1 and 4. A bottom member 20, similar in construction to the top member 18, extends between the side members and is attached to the member 16 by means of a suitable flange and bolts, as shown. A cover member 22, for providing ready access to the valve, is shown in section in FIG. 4. Flange portions 23 and 25 permit the attachment of the cover member to the side members and top and bottom members to produce a strong and protective housing for the valve.

Figure 2:
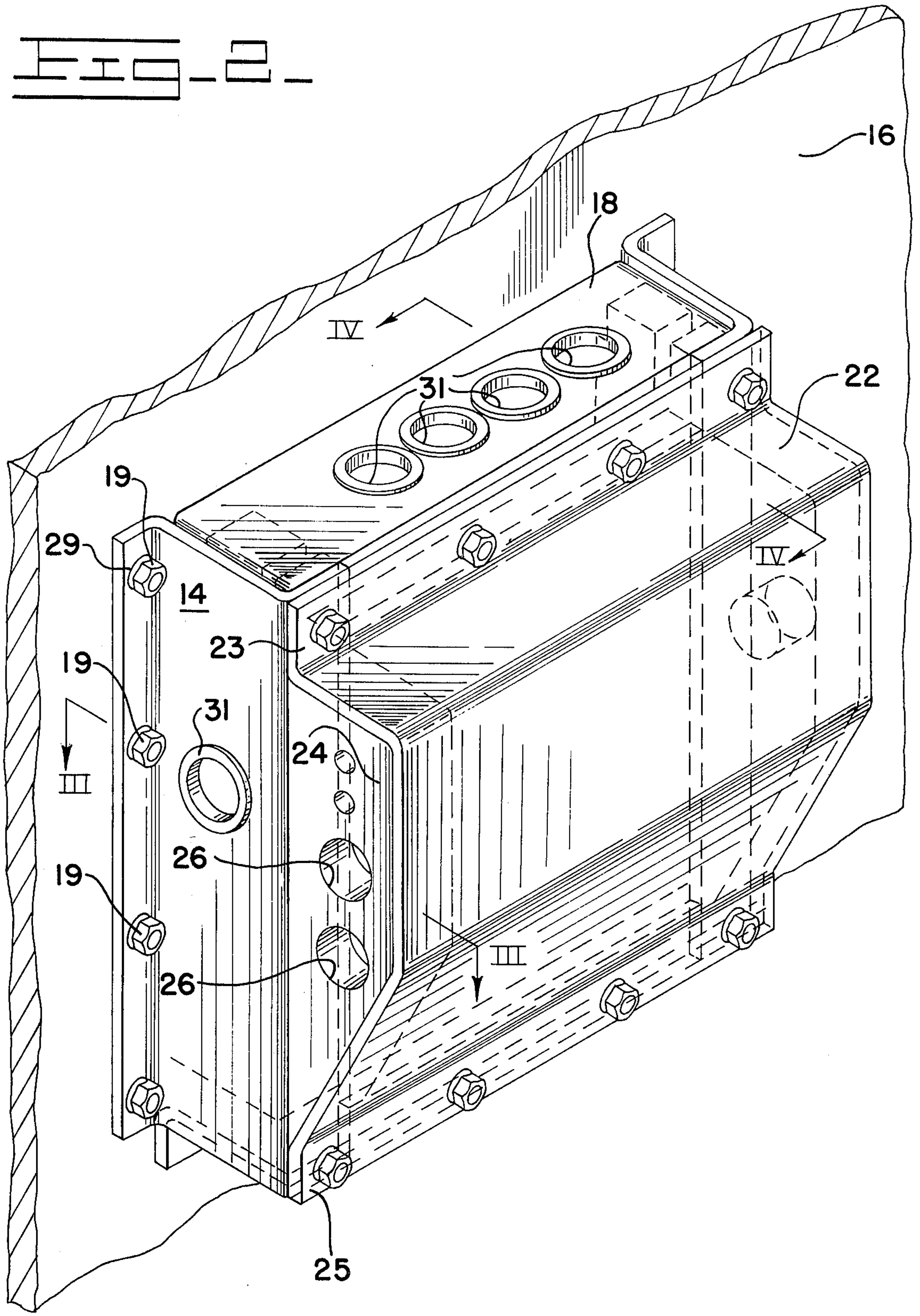
FIG. 2 is a top quarter isometric view of the present valve enclosure.

As best illustrated in FIGS. 2 and 3, the cap member 22 has open side areas for passage of the lines 13 therethrough. A pair of rubber plugs 24 having suitable apertures 26 are provided for sealingly filling the area surrounding such lines 13.

Interiorly of the rigid housing members is a lining of sound barrier material 27. Such material might be rubber, open cell polyurethane foam or other similar substance which prevents or substantially reduces the transmission of sound. In places where there is metal-to-metal contact and noise transmission might be expected, noise attenuators, such as elastomeric isolators 29 and/or sealing rings 31, are provided, as shown in FIGS. 2, 4, and 5.

As seen in FIG. 5, the isolators 29 are used in conjunction with a rigid tubular member 33 which serves as a spacer between washer 35, the head 37 of bolt 39 and valve body 41.

Preferably, when the enclosure is properly installed over the valve and the plugs 24 and rings 31 are correctly fitted over the lines 13 and other valve protuberances, the enclosure not only substantially reduces or eliminates the transmission of valve noise to the environment but also effectively seals the enclosure against the admission of extraneous liquids and debris.

It is to be understood that the foregoing description is merely illustrated of the preferred embodiment of the invention and that the scope of the invention is not to be limited thereto, but is to be determined by the scope of the appended claims.

What is claimed is:

1. A noise attenuating enclosure for a valve having protruding fluid lines and control apparatus, said enclosure comprising; a top member, a bottom member, a pair of oppositely facing spaced-apart side members extending between said top and bottom members and forming therewith a box-like structure, a cover member having first and second flanges for removably attaching said cover member to said side members, sound attenuating lining means associated with each of said top member, bottom member, side members and cover member for substantially reducing the transmission of valve noise through said members, wherein access gaps are provided between said side members and said cover member for the accommodation of said fluid lines, and further including fitted plug means of sound barrier material for sealingly filling said access gaps except for the space taken by said fluid lines.

2. The invention of claim 1 wherein said plug means consist of a pair of perforate resilient stopper members.

3. The invention of claim 2 wherein the resilient stopper members are made of rubber material.

4. The invention of claim 1 wherein said top member contains at least one aperture for the passage of protruding control apparatus therethrough, said at least one aperture being fitted with a sealing ring fabricated from sound barrier material.

* * * * *